United States Patent [19]

Gentry

[11] Patent Number: 4,528,660
[45] Date of Patent: Jul. 9, 1985

[54] MULTIPLEXED DATA STREAM MONITOR

[75] Inventor: James F. Gentry, Glen Burnie, Md.

[73] Assignee: The United States of America as represented by the Secretary of the Air Force, Washington, D.C.

[21] Appl. No.: 559,611

[22] Filed: Dec. 8, 1983

[51] Int. Cl.$^3$ .............................. H04J 6/02; H04J 3/10
[52] U.S. Cl. ......................................... 370/80; 370/79; 340/825.06; 340/146.2
[58] Field of Search ........................ 370/80, 100, 79; 340/825.07, 825.06, 146.2

[56] References Cited

U.S. PATENT DOCUMENTS

| | | | |
|---|---|---|---|
| 4,053,871 | 10/1977 | Vidalin et al. | 340/146.2 |
| 4,066,844 | 1/1978 | Ridings et al. | 370/80 |
| 4,101,903 | 7/1978 | Slay | 340/146.2 |
| 4,166,271 | 8/1979 | Thielwall et al. | 340/146.2 |
| 4,287,508 | 7/1981 | Arita et al. | 340/825.07 |
| 4,356,566 | 10/1982 | Wada et al. | 370/100 |
| 4,414,677 | 11/1983 | Iue et al. | 340/146.2 |
| 4,443,860 | 4/1984 | Vidalin | 340/146.2 |

Primary Examiner—Douglas W. Olms
Assistant Examiner—Curtis Kuntz
Attorney, Agent, or Firm—Donald J. Singer; Bernard E. Franz

[57] ABSTRACT

A multiplexed data stream monitoring circuit comprises a random access memory for receiving and storing a multiplexed data stream which is transmitted together with a synchronization signal and a data clock. A counter circuit is reset by the synchronization signal and counts the data clock signals to accumulate counts uniquely identified with signals within the data stream which counts are used to address the random access memory. For each accumulated count within the counter circuit, the corresponding accumulated count location is addressed in the random access memory to read the immediately preceding state of the current signal within the multiplexed data stream. The current data stream signal and the immediately preceding data stream signal as read from the random access memory are compared by gating circuitry to identify characteristics of the data stream. State changes of the signals within the multiplexed data stream are identified if the gating circuitry comprises an EXCLUSIVE OR gate.

7 Claims, 3 Drawing Figures

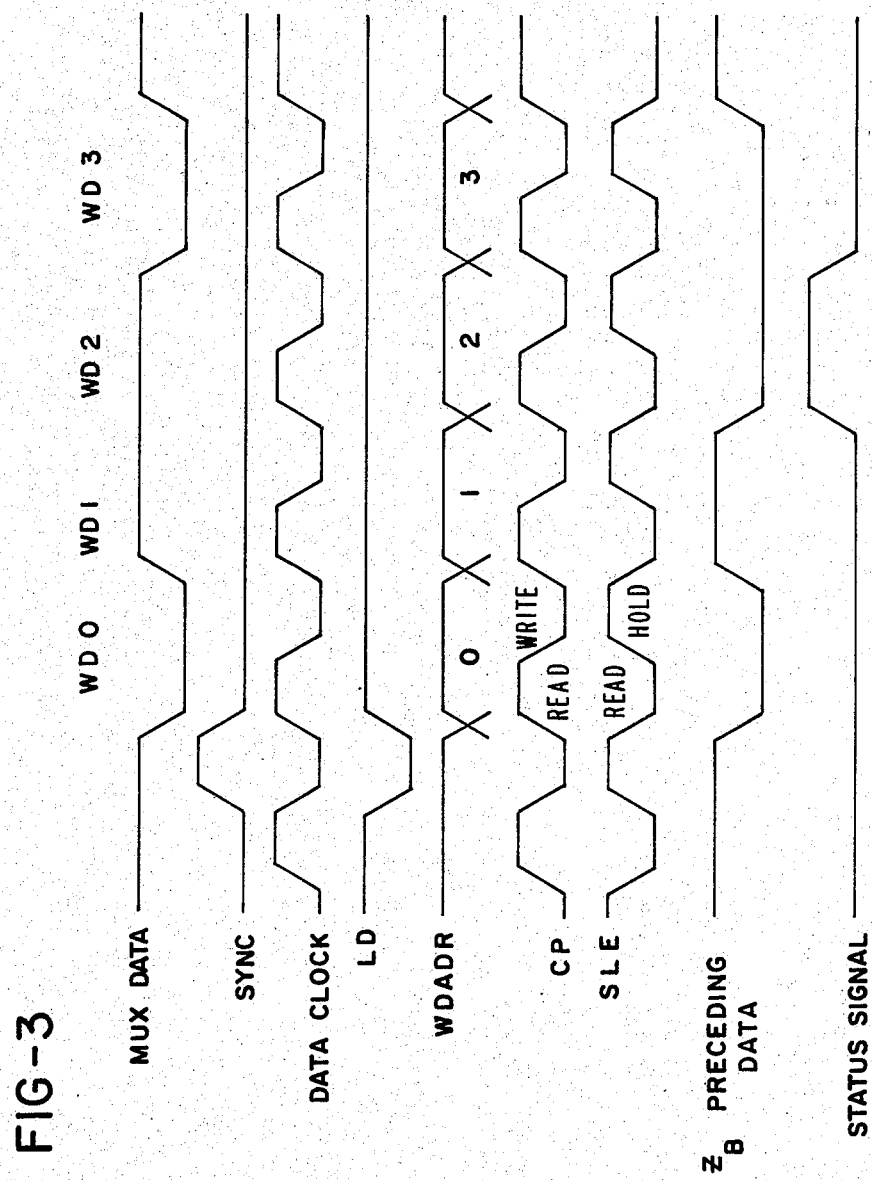

MULTIPLEXED DATA STREAM MONITOR

RIGHTS OF THE GOVERNMENT

The invention described herein may be manufactured and used by or for the Government of the United States for all governmental purposes without the payment of any royalty.

BACKGROUND OF THE INVENTION

The present invention relates to multiplexed data signals and, ore particularly, to a circuit for monitoring a multiplexed data stream to generate signals representative of a variety of characteristics of the multiplexed data stream and especially representative of signal level changes within the multiplexed data stream.

It is oftentimes necessary or desirable to transmit several signals occupying the same time range over a single channel. Various well-known modulation techniques referred to generically as multiplexing allow the signals to share the same channel and yet be recovered separately. Multiplexing, for example, permits the number of channels in a transmission system or conductors in a cable to be reduced for size and economy considerations.

As the number of signal sources in a multiplex data system increases, it may be desirable to arrange the sources into banks of sources with each bank comprising a fractional number of the total sources. For an orderly arrangement, it is convenient to organize the banks as columns of a matrix with the individual sources of the banks being in different rows of the matrix. Each bank or column is assigned to a specific time slot or portion of the multiplexed signal with the signal from one source in each of the columns being sampled during a given time interval which is referred to as a frame of the multiplexed signal.

For all of the sources of a large, matrix organized multiplex system to be sampled, a number of frames equal to the number of rows of the matrix must be transmitted with a different source from each column being sampled during each frame. In such a matrix arrangement, a multiplex bus is provided to connect the signal generating sources and a remote user of the signals generated by the sources. The multiplex bus may have a control line corresponding to each row of the matrix, in which event, the interconnecting channel comprises: the multiplexed data from all the signal sources; a frame synchronizing signal; a data clock defining when data is valid in each time slot; and, one line for each row of signal sources such that the active row for each time slot can be indicated.

Such a multiplexing arrangment functions quite well unless the number of signal sources is so great that the time between samples for a given signal source becomes excessive such that the sample frequency is less than the transition frequency of the signal source.

SUMMARY OF THE INVENTION

In accordance with the present invention, problems in multiplex systems which include large numbers of signal generators are overcome by monitoring a multiplexed data stream to determine the characteristics of the data stream. A data stream status signal is generated to indicate, for example, when the current state of a given signal within the multiplexed data stream has changed from that signal's immediately preceding state. Such a state change status signal permits the end user to only monitor signals within the multiplexed data stream which correspond to active signal generators, i.e., signal generators which have had a state change in their output signals since the last time the signal generators were sampled. The use of the state change status signal permits the multiplex system to effectively increase the sampling rate for dynamic signal generators since the signals from such generators can be sent more frequently while the signals from signal generators which change infrequently can be sent only as often as there are signal changes.

A multiplexed data stream monitoring circuit in accordance with the present invention comprises memory means for receiving and storing a multiplexed data stream wherein repetitive portions of the data stream correspond to the output signals of at least two signal generators the output signals of which are multiplexed to form the multiplexed data stream. Control means are provided for accessing the memory in synchronism with the multiplexed data stream such that a storage location corresponding to a given signal generator is addressed during the receipt of the time slot or that portion of the multiplexed data stream which corresponds to the output signal of the given signal generator. Each storage location in the memory is initially read to retrieve the preceding state of the corresponding signal and is then written to contain the current signal state. Signals representative of the status of the multiplexed data stream, i.e., various characteristics of the data stream, are generated by gating means which are responsive to the current state of the multiplexed data stream and the immediately preceding state of the multiplexed data stream represented by the signals read from the memory.

The addressing means preferably comprises a counter circuit for counting clock pulses synchronized with the data stream. Count signals accumulated in the counter circuit are used to address the memory to thereby assign a unique memory location to each of the signals which repetitively occurs in the multiplexed data stream. A frame synchronizing signal is provided and resets the counter circuit. Accordingly, the first frame signal or the signal occuring simultaneously with the frame synchronizing signal is designated as signal "zero". The memory means preferably comprises a random access memory.

The gating means is selected to generate signals indicative of specific characteristics of the data stream. For example, an EXCLUSIVE OR gate generates a status signal upon each state change of a signal within the data stream, i.e., the status signal corresponds to a state change signal. Other gate circuits can be utilized to generate status signals identifying low-to-high signal transitions, high-to-low signal transitions and other characteristics of the multiplexed data stream.

It is, therefore, an object of the present invention to provide a multiplexed data stream monitoring circuit which generates signals representative of the status of the data stream in response to the current state of data stream signals and their immediately preceding state with the immediately preceding state of the signals being read from a memory which is then written to store the current state of the data stream signals for use in analyzing the immediately following data stream signals.

It is another object of the present invention to provide such a multiplexed data stream monitoring circuit wherein data stream signals are stored in the circuit wherein data stream signals are stored in the memory at memory locations addressed by accumulated counts within a counter circuit which repetitively counts clock pulses synchronized with the multiplexed data stream.

Other objects and advantages of the invention will be apparent from the following description, the accompanying drawings and the appended claims.

BRIEF DESCRIPTION OF THE DRAWINGS

FIG. 3 is a timing chart showing a series of waveforms to illustrate the operation of the multiplexed data stream monitoring circuit of FIG. 2.

DETAILED DESCRIPTION OF THE INVENTION

Figure 1:
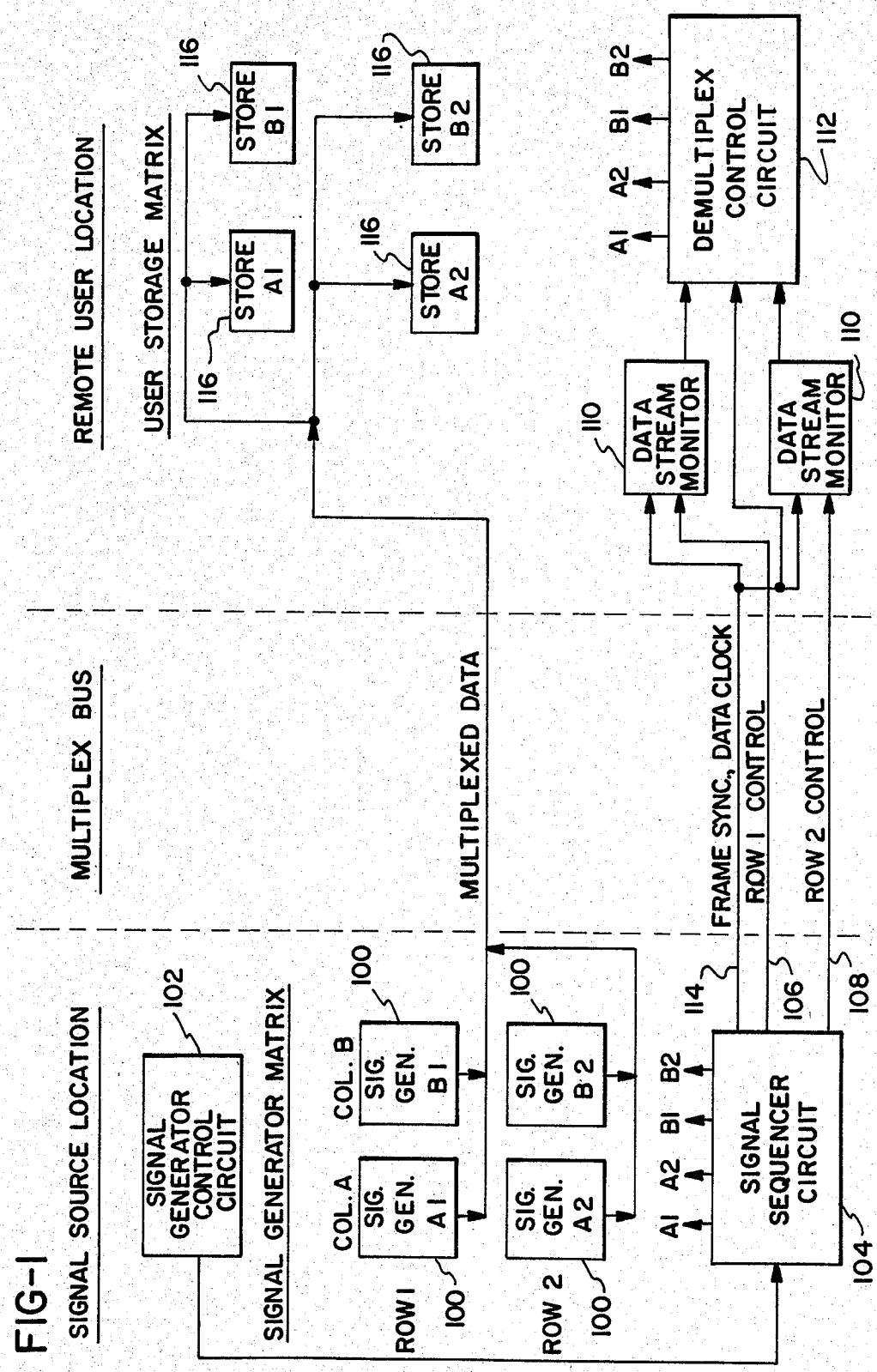
FIG. 1 is a block diagram of a simplified multiplex data system incorporating the multiplexed data stream monitoring circuit of the present invention.

To illustrate utilization of the present invention, a simplified multiplex data system is shown in block diagram form in FIG. 1. For ease of illustration and description, the system includes only four signal generators 100. While the invention of the present application can be used in such a simplified system, it is to be understood that the present invention is primarily applicable to multiplex systems wherein the output signals from a large plurality of signal generators are mutiplexed into a single data stream.

In FIG. 1, the signal generators 100 are organized into a matrix having Columns A and B and Rows 1 and 2. Hence, the signal generators 100 are conveniently identified as banks of signal generators A1,A2 and B1,B2. In this simplified multiplex data system, there are only two banks or columns A,B of signal generators and accordingly, there are only two time slots per transmission frame. During the first time slot, the signal from either signal generator A1 or A2 appears and during the second time slot, the signal from either signal generator B1 or B2 appears.

A signal generator control circuit 102 determines which generator signal is placed on the multiplex bus during a given time slot and notifies a signal sequencer circuit 104 of the identification of the signal generators whose output signals have changed. The signal sequencer circuit 104 places the corresponding active generators, i.e., generators which have had state changes of their output signals, on line in the next frame of the multiplexed signal in the correct time slot and changes the corresponding row control signal transmitted on the conductors 106 and 108 for Row 1 and Row 2, respectively. The signal sequencer circuit 104 also resolves conflicts when more than one generator signal has a changed state output signal and, hence, more than one generator signal needs to be placed on-line in the next time slot. Such conflict resolution is performed on a priority basis, by polling or by other conflict resolution arrangements well known to those skilled in the art.

At the remote user location, multiplexed row control signals on the conductors 106 and 108 are received by multiplexed data stream monitor circuits 110 in accordance with the present invention. The output signals from the monitor circuits 110 indicate to a demultiplexer control circuit 112 which rows are active (i.e., have signal state changes) during which time slots.

In response to the signals from the monitor circuits 110, a frame synchronization signal and a data clock signal received on conductors 114, the demultiplex control circuit 112 activates the appropriate user storage devices 116 to store the data signals corresponding to signal generators A1,A2, B1 and B2. For example, a column signal generated by counting the data clock to define the time slots in a data frame can be combined with the output signals from the monitor circuits 110 and the data clock signal to update the storage devices 116.

In the illustrative multiplex system of FIG. 1, it should be noted that more than one row control signal can be changed in a given time slot. Such operation permits more than one user storage device 116 to be set to a value specified by one of the signal generators 100 in a single time slot. Such operation can be utilized for initialization of a system, multiple outputs, selective shutdown and similar operations. A variety of multiplex/demultiplex system components for the system of FIG. 1 are available and well known in the art and therefore will not be further described herein.

Figure 2:
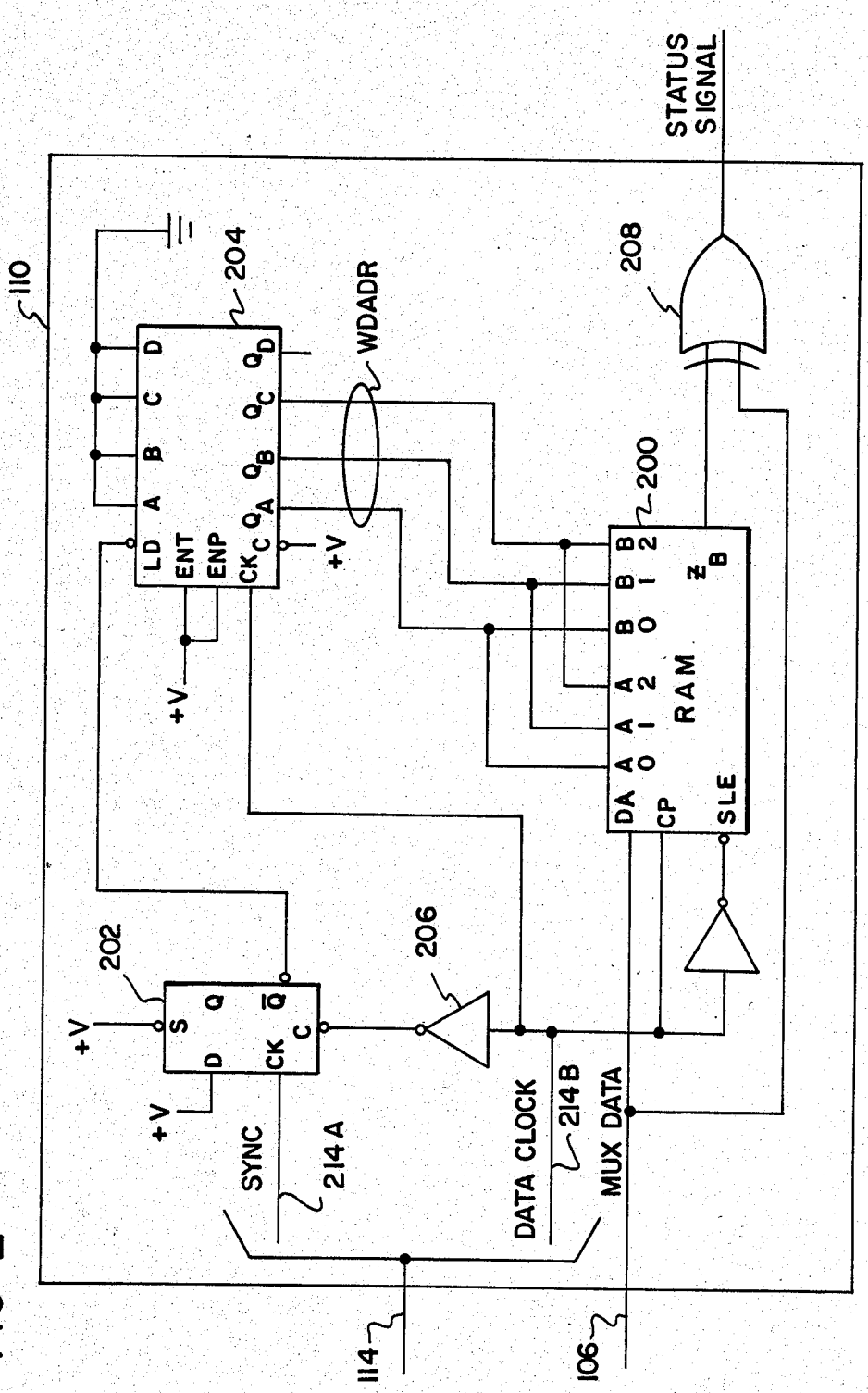
FIG. 2 is a detailed schematic diagram of an illustrative embodiment of a multiplexed data stream monitoring circuit in accordance with the present invention.

FIG. 2 is a detailed schematic diagram of an illustrative embodiment of a multiplexed data stream monitoring circuit 110 in accordance with the present invention. Since both of the monitoring circuits 110, shown in FIG. 1, are identical to one another, only the monitoring circuit corresponding to Row 1 will be described. The multiplexed data stream MUX DATA is received on the conductor 106. For the multiplex system of FIG. 1, this data comprises control data for Row 1 of the signal generator matrix of that figure.

The multiplexed data stream on the conductor 106 is connected to the data input, $D_A$, of a random access memory (RAM) 200. A suitable random access memory 200 for the illustrative multiplex system comprises an 8 bit multiple port register commercially available from Fairchild as a TTL/MSI 9338. The monitoring circuit 110 as shown in FIG. 2 could handle a multiplex system as shown in FIG. 1 having up to 8 banks of signal generators.

The frame synchronization signal SYNC is received on the conductor 214A and passed to the clock input of a D flip-flop 202. Each occurrence of the synchronization signal pulse clears the flip-flop 202 to generate a negative going pulse on the input LD to a counter circuit 204. This low-going signal on the LD input counter circuit loads the signal on the inputs A, B, C and D into the counter. Since these inputs are tied to ground or low potential, all "zeros" are loaded into the counter circuit 204 to thereby initialize and define the "zero" data word location in the random access memory 200. A suitable counter circuit 204 for the illustrated monitoring circuit 110 is available from Texas Instruments as an SN74161.

The data clock signal DATA CLOCK on the conductor 214B clears the flip-flop circuit 202 immediately after the synchronization signal via an inverter circuit 206 to permit the counter circuit 204 to count pulses of the data clock. Count signals appear on the outputs $Q_A$, $Q_B$, $Q_C$ and $Q_D$ of the counter circuit 204 and are connected to the write address inputs $A_0$–$A_2$ and the read address inputs $B_0$–$B_2$ of the random access memory 200. Since only 8 single bit data words are stored in the random access memory 200, the output $Q_D$ of the counter circuit 204 is unused.

The data clock signal on the conductor 214B is connected to the clock pulse input CP of the random access memory 200 while the inverse of the data clock signal is connected to the slave enable input SLE. The output $Z_B$ from the random access memory 200 corresponds to the contents of the location addressed by the read address inputs $B_0$-$B_2$. By driving the slave enable input SLE with the inverted data clock signal, the contents of the addressed location of the random access memory 200 is initially read and passed to its output $Z_B$ during the first half of the clock cycle and then is held in an output flip-flop during the last half of the clock cycle. Thus, during the last half of the clock cycle, the output signal from the memory 200 on output $Z_B$ remains stable even though the present multiplexed data word is being written into the defined location of the random access memory 200 by the data clock signal on the memory clock pulse input CP.

In the multiplex system of FIG. 1, each change in the multiplexed data, i.e., the row control data, is to be detected and, hence, the output of the random access memory $Z_B$ is connected as one input to an EXCLUSIVE OR gate 208 while the current multiplexed data stream is connected as the other input to the EXCLUSIVE OR gate 208. For this gating, i.e., an EXCLUSIVE OR function of the current and immediately preceding states of the multiplexed data stream, the output of the EXCLUSIVE OR gate 208 generates a high voltage level or logical "one" status pulse each time the input data on the conductor 108 changes state from its preceding state which was stored in the random access memory 200.

A variety of other data stream characteristics can be determined in accordance with the present invention by substituting different types of gates in place of the EXCLUSIVE OR gate 208 in the schematic diagram of FIG. 2 and/or by inverting the current or preceding data states. For example, the following characteristics of the data stream can be determined by utilization of the defined gate circuits.

If an AND gate is substituted for the EXCLUSIVE OR gate 208, the output of the AND gate will go to a high voltage level or logical "one" state one frame delay after the corresponding output signal from a generator goes to a high voltage or logical "one" state and will go to a low voltage level or logical "zero" state the same frame that the signal returns to a low voltage level or logical "zero" state.

If an OR gate is substituted for the EXCLUSIVE OR gate 208, the output signal from the OR gate will go to a high voltage level or logical "one" state on the same frame that the corresponding signal generator output signal goes to a high voltage or logical "one" state and will go to a low voltage level or logical "zero" state one frame delay after the signal returns to a low voltage level or logical "zero" state.

By substituting an EXCLUSIVE NOR gate for the EXCLUSIVE OR gate 208, the output signal of the EXCLUSIVE NOR gate will go to a high voltage level or logical "one" state only when the past and the present frame contain the same data value and, hence, such a configuration can be used as a "debounce" delay, for example, if a relay contact is monitored to generate the corresponding signal in the multiplexed data stream.

In the event that only low-to-high or high-to-low transitions of the multiplexed data signals are to be detected, the EXCLUSIVE OR gate 208 can be replaced with an AND gate. Output signals of the AND gate identify low-to-high transitions of signals within the multiplexed data stream provided the inverse of the data stream signals are stored into the random access memory 200 or the output signals of the random access memory 200 are inverted prior to being received as input signals of the AND gate. Alternately, the output signals of the AND gate identify high-to-low transitions of multiplexed data signals provided the current multiplexed data stream is inverted prior to being passed to an input of the AND gate.

Operation of the data stream monitoring circuit in accordance with the present invention will now be summarized with reference to FIG. 2. The counter circuit 204 is used to assign a unique number to each of the signals in the data stream MUX DATA received on the input conductor 106. Each time a frame synchronization signal SYNC is received on the input conductor 214A, the counter circuit 204 is reset such that the signal occurring at that time is signal "zero" of the multiplexed data frame. At the trailing edge or low-to-high transition of each clock cycle DATA CLOCK, the counter circuit 204 is incremented. The output signals WDADR from the counter circuit 204 are used to address the random access memory 200. The multiplexed data signal MUX DATA is connected to the data input $D_A$ of the random access memory 200 and is written into the random access memory during the last half of each clock cycle.

When the counter circuit 204 changes states, the location defined by the count signals contained within the counter circuit 204 is addressed in the random access memory 200. The previous state of that signal is thus available at the output $Z_B$ of the random access memory 200 for comparison with the current value of the signal at the data input $D_A$ of the random access memory 200. A gating circuit compares these two values to determine a selected characteristic of the multiplexed data stream, for example, if an EXCLUSIVE OR gate is used as shown in FIG. 2, any state change of a signal in the multiplexed data stream will be identified.

In the last half of the clock cycle, while the output read from the random access memory 200 is maintained on the output $Z_B$ of the random access memory 200, the current state of the signal is written into the random access memory 200 for use during the next occurrence of the corresponding signal in the multiplexed data stream MUX DATA. As the counter circuit 204 is incremented, the process is carried out for each of the associated count signals accumulated in the counter circuit 204.

It is noted that the waveforms of the timing diagram shown in FIG. 3 correspond to the operation of the multiplexed data stream monitoring circuit 110 shown in FIG. 2 for a multiplexed data stream containing four multiplexed signals. The monitor circuit 110 as shown in FIG. 2 would function in the multiplexed system shown in FIG. 1 with the counter circuit 204 being reset after every two data counts since each data frame includes only two time slots but would permit expansion of the system for up to 8 columns or banks as previously suggested.

While the data stream monitoring circuit of the present invention has been described for use in the illustrative multiplex system of FIG. 1, it will be apparent from this disclosure that the monitoring circuit can be used for a variety of purposes. For example, the monitoring circuit can be used to detect changes in data being sent: changes in alarm or security system sensors can be monitored; data system signals leading to processor interrupts can be monitored; service request signals, e.g., from airline passengers, can be monitored; and other such signals which typically change infrequently.

On the other hand, signals which have repetitive state changes can be monitored to detect failures indicated by lack of such changes. These type signals are generated, for example, in production or control systems where conveyors, blowers, motors and the like are monitored and in data stability checks where a signal must remain stable for a given period of time before it is utilized.

It will be apparent to those skilled in the art that the data stream monitoring circuit 110 of FIG. 2 can be expanded initially by means of an extension of the random access memory 200 to a capacity of 16 and ultimately by means of the replacement of the counter circuit 204 and the random access memory 200 to correspond to a required number of columns in a multiplex data system. Thus, while the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. In a multiplex data system wherein output signals from a plurality of signal generators are sampled and multiplexed into repetitive frames of data onto a single channel for transmission to a remote user location, along with a synchronization signal and clock signals, a multiplexed data stream monitoring circuit comprising:
   memory means for storing a single frame of data as it is received at said user location;
   control means for accessing said memory means in synchronism with said multiplexed data stream, said control means comprising a counter circuit which counts said clock signals and is cleared by said synchronization signal, said memory means being addressed by the accumulated counts in said counter circuit which counts correspond to signals within said multiplexed data stream, such that a defined storage location corresponding to a given signal generator is addressed during the receipt of that portion of the multiplexed data stream corresponding to the output signal of said given signal generator, each of said storage locations being initially read and then written; and
   gating means responsive to the current multiplexed data stream and the signals read from said memory means corresponding to the immediately preceding state of said multiplexed data stream for generating a signal representative of the status of said multiplexed data stream, the gating means being selected to identify characteristics of signals within said multiplexed data stream.

2. A multiplexed data stream monitoring circuit as claimed in claim 1 wherein said memory means comprises a random access memory addressed by count signals accumulated in said counter circuit, said random access memory being activated to read data corresponding to the immediately preceding state of said multiplexed data stream during the first half of each clock cycle and write data corresponding to the current state of said multiplexed data stream during the second half of each clock cycle.

3. A multiplexed data stream monitoring circuit as claimed in claim 2 wherein changes in the data state of the signal from any of the multiplexed signal generators are indicated by said gating means status signal which gating means comprises an EXCLUSIVE OR gate.

4. A multiplexed data stream monitoring circuit as claimed in claim 1 wherein said gating means comprises an EXCLUSIVE OR gate such that said status signals identify state changes of signals within said multiplexed data stream.

5. A multiplex data system comprising a plurality of signal generators organized into a matrix having columns and rows, a signal generator control circuit, and a signal sequencer circuit, output signals from the signal generators being sampled and multiplexed into repetitive frames of data onto a multiplex bus for transmission to a remote user location, a synchronizational signal and clock signals being also sent to the remote user location via separate channels, and a separate row control channel for each row coupled from the signal sequencer circuit to the remote user location, said frames having a time slot for each column, the signal generator control circuit having means for determining which signal generator output signal is placed on the multiplex bus during each time slot and for notifying the signal sequencer circuit of the identity thereof, the signal sequencer circuit having means effective during each time slot of each frame to place a selected signal generator which has a change of state of its output signal on line to transmit its signal on the multiplex bus and to also change a corresponding row control signal transmitted on the row control channel corresponding to the selected signal generator, so that there is a multiplexed data stream transmitted on each row control channel;
   the remote user location having a plurality of stores coupled to receive signals from the multiplex bus, with a store for each of said signal generators, a demultiplex control circuit, and a plurality of data stream monitoring circuits, one for each row, coupled to receive signals from the corresponding row control channels;
   wherein each data stream monitoring circuit comprises:
   memory means for storing a single frame of data from the corresponding row control channel as it is received at said user location;
   control means for accessing said memory means in synchronism with said multiplexed data stream, said control means comprising a counter circuit which counts said clock signals and is cleared by said synchronization signal, said memory means being addressed by the accumulated counts in said counter circuit which counts correspond to signals for given columns within said multiplexed data stream, such that a defined storage location corresponding to a given time slot is addressed during the receipt of that portion of the multiplexed data stream corresponding to the output signal of said given column, each of said storage locations being initially read and then written; and
   gating means responsive to the current multiplexed data stream and the signals read from said memory means corresponding to the immediately preceding state of said multiplexed data stream for generating a signal representative of the status of said multiplexed data stream, the gating means being selected to identify characteristics of signals within said multiplexed data stream, the gating means having an output coupled to said demultiplex control circuit for supplying signals thereto for controlling the storage of data from said multiplex bus into said stores.

6. A system as claimed in claim 5, wherein said gating means of each data stream monitoring circuit comprises an EXCLUSIVE OR gate such that said status signals identify state changes of signals within said multiplexed data stream for that data stream monitoring circuit.

7. A system as claimed in claim 5, wherein the circuits include means such that more than one row control signal can be changed in a given time slot, to provide operation which permits more than one storage location to be set to a value specified by one of the signal generators in a single time slot.

* * * * *